No. 814,595. PATENTED MAR. 6, 1906.
A. J. EGGLETON.
PLANT OR FLOWER POT.
APPLICATION FILED FEB. 20, 1905.

Witnesses
Dennis Sumby
C. A. Kesler

Inventor
Alfred J. Eggleton
By James L. Norris
Atty

UNITED STATES PATENT OFFICE.

ALFRED J. EGGLETON, OF DUNEDIN, NEW ZEALAND.

PLANT OR FLOWER POT.

No. 814,595.           Specification of Letters Patent.           Patented March 6, 1906.

Application filed February 20, 1905. Serial No. 246,614.

*To all whom it may concern:*

Be it known that I, ALFRED JOHN EGGLETON, tramway manager, a subject of the King of Great Britain, residing at 49 Moray Place, in the city of Dunedin, in the British Colony of New Zealand, have invented certain new and useful Improvements in Pots, entitled "Improved Plant or Flower Pots," of which the following is a specification.

The object of this invention is to produce a series of flower-pots in a single structure and adapted for growing a large number of plants in a limited space. In the use of the construction involved the plants being separate can each be provided with the most suitable soil for each and with the requisite amount of moisture and can receive separate treatment, if required.

The invention is illustrated in the accompanying drawings, in which—

Figure 1:
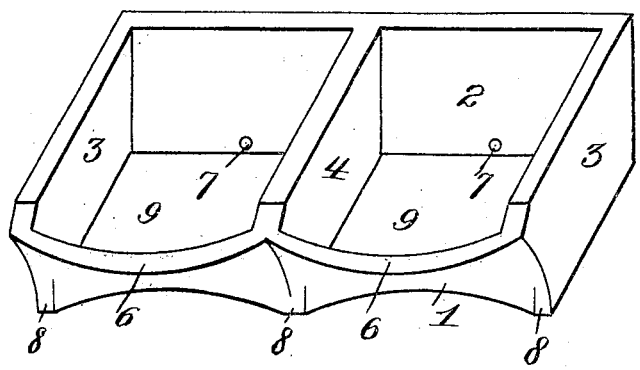
Figure 2:
Figure 2:
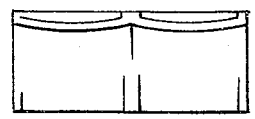
Figure 3:
Figure 4:
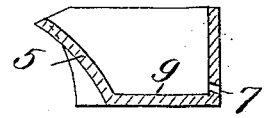

Figure 1 is a view in isometric perspective, showing a flower-pot constructed according to my invention. Fig. 2 represents two similar front elevations of the flower-pot. Fig. 3 is an end view of the flower-pot of Fig. 2, opposite which it is located; and Fig. 4 is a sectional view of the corresponding flower-pot of Fig. 2.

The flower-pot comprises a front wall 1, a rear wall 2, end walls 3, and a central wall or partition 4, extending parallel with the end walls 3 and located centrally between the same. The front wall 1 of each compartment is preferably curved outward, as indicated at 5 in Fig. 4, and its upper edge portion is cut away on curved lines, as indicated at 6 in Fig. 1, the outward curvature of the wall being for the purpose of permitting plants to grow outward toward the front of the box, while the cutting away of the upper edge of the front walls is for the purpose of providing spaces for access to the plants when several of the pots are placed one upon the other, as is contemplated in the use of the invention. In each of the compartments afforded by the end walls 3 and partition 4 I provide a drainage-opening 7, which is located in the rear wall of the device. The flower-pot is provided at its sides and central portion with projecting feet or standards 8, which are designed to afford a firm support. The drainage-openings 7 are preferably located a little above the bottom 9 of the device.

I prefer as a general rule to make these pots square or oblong, so that they may be used to build walls or terraces or for making other ornamental designs, such as pillars, arches, &c. It will be obvious, however, that the shape of the pot may be varied without departing from the spirit of my invention

Having thus fully described my invention, what I claim as new, and desire to secure by Letters Patent, is—

1. A flower-pot comprising bottom, side and end walls and a central partition forming two compartments, one of the side walls, forming the front of the device, being outwardly curved and cut away opposite each compartment and the other side, forming the back of the pot, being provided with apertures forming drainage-ports for each compartment.

2. A flower-pot formed as an integral structure and affording several compartments, the front wall of each compartment being outwardly curved and having its upper edge portion cut away.

3. A flower-pot formed as an integral structure and affording several compartments, the front wall of each compartment being outwardly curved and having its upper edge portion cut away, and standards or feet projecting outwardly from the front of said compartment, the rear wall of each compartment being provided with a drainage-opening.

Dated this 31st day of December, A. D. 1904.

ALFRED J. EGGLETON.

Witnesses:
HENTON MACAULAY DAVEY,
ELIZABETH ANN COLLINSON